(12) United States Patent
St-Pierre et al.

(10) Patent No.: US 7,159,955 B2
(45) Date of Patent: Jan. 9, 2007

(54) TRACTION BAND AND SPROCKET FOR VEHICLES

(75) Inventors: Yves St-Pierre, Wickham (CA); Hugo Bastien, Drummondville (CA); Eric Blais, Drummondville (CA); Chad Olson, Isanti, MN (US)

(73) Assignee: Soucy International Inc., Drummondville (CA)

( * ) Notice: Subject to any disclaimer, the term of this patent is extended or adjusted under 35 U.S.C. 154(b) by 0 days.

(21) Appl. No.: 10/737,719

(22) Filed: Dec. 16, 2003

(65) Prior Publication Data

US 2004/0178677 A1    Sep. 16, 2004

(30) Foreign Application Priority Data

Dec. 17, 2002   (CA) .................................. 2414655

(51) Int. Cl.
*B62D 55/24*   (2006.01)
*B60B 37/00*   (2006.01)

(52) U.S. Cl. .................. 305/168; 305/169; 305/193; 305/199

(58) Field of Classification Search ............... 305/165, 305/167–169, 173, 175, 193–195, 199, 181, 305/135, 129–133; 474/152, 158, 162, 164
See application file for complete search history.

(56) References Cited

U.S. PATENT DOCUMENTS

| | | | | |
|---|---|---|---|---|
| 698,991 | A * | 4/1902 | Morse ......................... | 474/152 |
| 2,787,483 | A * | 4/1957 | Harvey et al. .............. | 474/152 |
| 2,932,207 | A * | 4/1960 | Whitney ...................... | 474/152 |
| 3,162,057 | A * | 12/1964 | Burrell ........................ | 474/152 |
| 3,575,474 | A * | 4/1971 | Russ, Sr. ..................... | 305/165 |
| 3,612,625 | A * | 10/1971 | Huber ......................... | 305/179 |
| 3,664,715 | A * | 5/1972 | Huber ......................... | 305/179 |
| 3,680,925 | A * | 8/1972 | Spivy ......................... | 305/168 |
| 3,722,962 | A * | 3/1973 | Cooper ........................ | 305/180 |
| 3,738,714 | A * | 6/1973 | Ness ........................... | 305/127 |
| 3,754,798 | A * | 8/1973 | Chaumont .................. | 305/166 |
| 3,756,668 | A * | 9/1973 | Russ, Sr. ..................... | 305/179 |
| 3,937,289 | A * | 2/1976 | Dickinson .................. | 180/9.44 |
| 4,217,006 | A * | 8/1980 | Dehnert ..................... | 305/168 |
| 4,474,414 | A * | 10/1984 | Tokue ........................ | 305/168 |
| 4,527,987 | A * | 7/1985 | Berchem .................... | 474/152 |
| 5,201,574 | A * | 4/1993 | James et al. ................ | 305/180 |

* cited by examiner

*Primary Examiner*—Jason R. Bellinger
(74) *Attorney, Agent, or Firm*—Fay, Sharpe, Fagan, Minnich & Mckee, LLP

(57) ABSTRACT

This invention relates to an endless traction band that is used to propel band laying vehicles [i.e., vehicles which use endless traction bands rather than tires to contact the terrain over which they are driven, e.g., tractors, tanks, bulldozers, etc.]. A novel sprocket wheel having a plurality of radially extending and offset teeth cooperates with an endless traction band having a plurality of holes. Longitudinally consecutive holes define either meshing areas or clip areas. The meshing areas are adapted to be engaged by the sprocket wheel and the clip areas are adapted to support clips.

13 Claims, 7 Drawing Sheets designed. The traction lugs are used to increase the adherence of the snowmobile on snow mud, melting snow, ice or any other similar surfaces.

Further, the opposite lateral band portions are usually separated from the central portion by a corresponding row of holes. Each row of holes generally cooperates with the teeth of the corresponding sprocket wheels and idler wheels or simply provides a support area for metal clip.

The ground-engaging outer side usually has a sequence of profiles that is repeated uniformly or not over the total length of the traction band. Each sequence of profiles or tread pattern comprises laterally extending profiles that are longitudinally spaced apart by flat areas. Each profile comprises a series of outwardly projecting traction lugs. The choice of lug profiles that are selected to be part of every sequence of profiles, which is repeated along the circumference of the traction band, has an influence on the band behavior on the snow, on the snowmobile performances and on the comfort of the driver. These criteria are very critical in a marketing point of view, since they differentiate products from one another in the eye of a potential customer.

There is always a need for a traction band which provides better performance and better comfort for the driver.

TRACTION BAND AND SPROCKET FOR VEHICLES

FIELD OF INVENTION

This invention relates to an endless traction band and sprocket wheel that are used to propel vehicles and more particularly snowmobiles.

BACKGROUND OF THE INVENTION

The present invention relates to an endless traction band for a snowmobile and to the sprocket wheel used therewith. Such a traction band is designed to travel on snow, on which the use of wheeled vehicle is of little help.

A traction band is usually made of a reinforced molded rubber material or an assembly of interconnected parts that form an endless band, having longitudinally spaced and transversely disposed stiffeners embedded in the rubber material. The endless band is flexible around a lateral axis so that it can follow the curvature around sprocket and idler wheels. Each traction band is designed to support a significant portion of the total weight of the vehicle and apply a traction force on the ground.

As used herein, the term "rubber" relates to any elastic and primarily non-metallic materials such as rubber, elastomers, or combinations thereof used in the manufacture of endless traction bands.

Among all off-road vehicles equipped with traction bands, recreational snowmobiles are unique in that they are equipped with only one traction band while essentially all other vehicles are equipped with two or more traction bands. Examples of such other vehicles are bulldozers, military tanks, snow-surfacing machines, etc.

Without excluding any other applications, traction bands for vehicles traveling at moderate or high speeds, which are essentially snowmobiles, are the prime interest of the present invention. The snowmobiles are then used in the present description as the main application for the traction bands and the method in accordance with the present invention.

A snowmobile is often equipped with a rubber-band traction band that features an endless body made of a reinforced rubber material with longitudinally spaced and transversely disposed stiffeners embedded in the rubber material. The body typically defines a longitudinally extending central portion and a pair of lateral band portions each of which is located on one of the sides of the central portion. The traction band is positioned under the chassis of the snowmobile and supports most of the weight. A pair of front ski-like runners is provided to steer the snowmobile and support the other portion of the weight.

The body of the traction band has a ground-engaging outer side and an inner side. The inner side cooperates with a suspension system. The weight of the traction band is supported by either a pair of slide rails or a plurality of bogey wheels that are mechanically connected to the other parts of the suspension system. The suspension system is also used to support the traction band with respect to lateral movements.

The ground-engaging outer side has a tread pattern that is repeated uniformly or not over the entire length of the traction band. The tread pattern comprises a plurality of projecting traction lugs that are configured and disposed in accordance with the purpose for which the traction band is designed.

SUMMARY OF THE INVENTION

The object of the invention is to create an improved driving system for a snowmobile.

It is another object to provide an improved drive sprocket for use with a snowmobile traction band.

It is still another object to provide a novel traction band for a snowmobile.

There is therefore provided a traction band for use with a snowmobile comprising a sprocket wheel having a plurality of teeth, said traction band comprising a ground-engaging outside surface on which are disposed a series of laterally extending traction lug profiles separated from each other by flat areas, each of which extend laterally and comprise none of the said traction lugs, said traction band further comprising a central longitudinally extending central band portion, wherein an opening adapted to receive one of said teeth extends through each flat area of said central band portion.

In another aspect of the invention the said sprocket wheel comprises two parallel disks each provided with traction teeth and two holes extend through each said central flat area of the traction band.

Other aspects and many of the attendant advantages will be more readily appreciated as the same becomes better understood by reference to the following detailed description and considered in connection with the accompanying drawings in which like reference symbols designated like elements throughout the figures.

The features of the present invention which are believed to be novel are set forth with particularity in the appended claims.

DETAILED DESCRIPTION OF A PREFERRED EMBODIMENT

Figure 1:
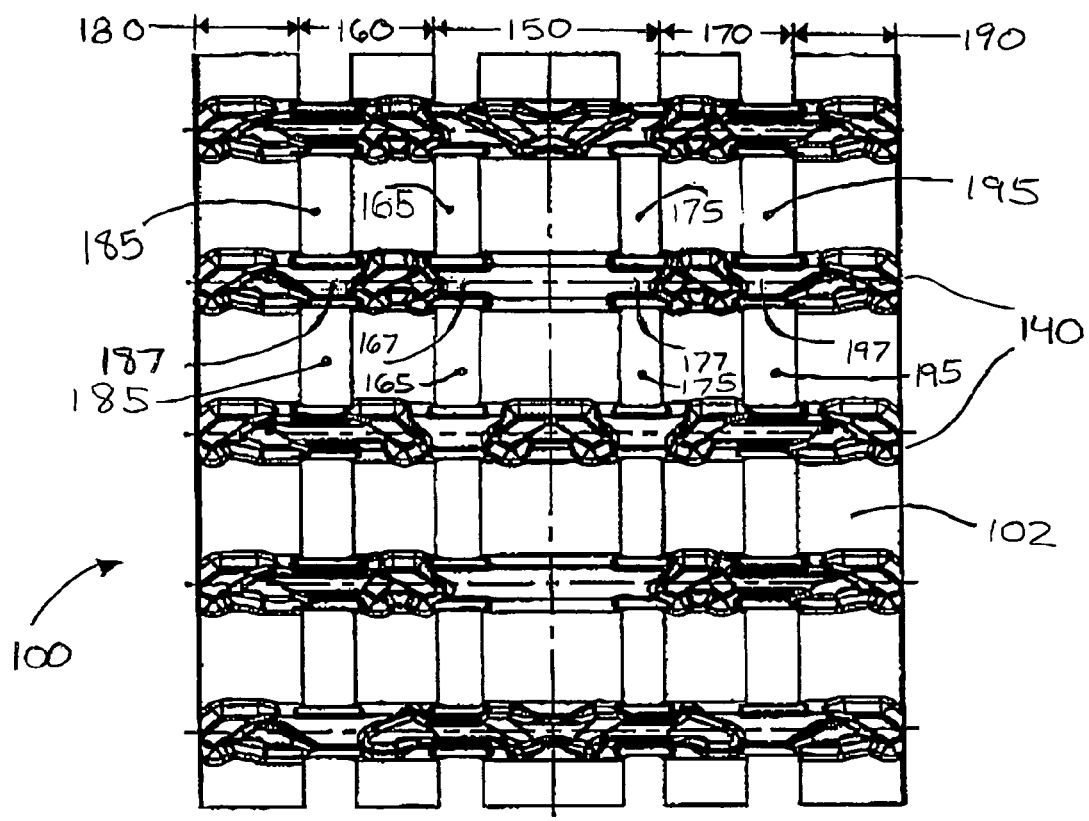
FIG. 1 is a partial top view of a first embodiment of an endless traction band in accordance with the invention.

A traction band according to a preferred embodiment of the present invention is described hereinafter and illustrated in the appended figures.

As shown in the figures, the band 100 is made of an endless body 102 of reinforced rubber material, with longitudinally spaced and transversely disposed stiffeners (not shown) that may or may not be completely embedded in the rubber material of the endless body 102. FIGS. 1, 2, 3 and 4 show the body 102 which comprises a central portion 150, two mid-band portions (160 and 170) and two lateral band portions (180 and 190) which are located on each side of the central portion 150. The central portion 150, the mid-band portions 160 and 170 and the lateral band portions 180 and 190 longitudinally extend along the circumference of the endless body 102.

The body 102 of the band 100 has an inner side 107 and a ground-engaging outer side 108 that is usually made from a sequence of profiles 140 which is repeated or not over the entire circumference of the traction band 100. Each profile 140 comprises a selection of lugs 110 and are separated from each other by a flat area 130.

The traction band 100 shown in FIG. 1 comprises series of openings 165 and 175 in the central longitudinally extending central band portion 150 and preferably, series of openings 185 and 195 in the mid-band portions 160 and 170. Any two consecutive openings 165, 175, 185 or 195 in the same longitudinal series of openings define a support area 167, 177, 187, and 197 which can either offer support for metal clips (not shown) or a meshing area for a sprocket drive wheel.

Figure 2:
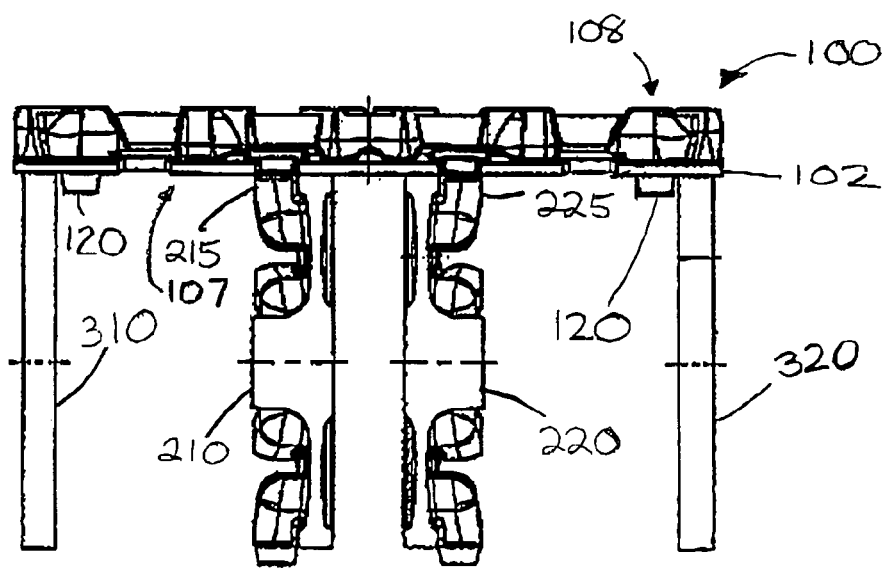
FIG. 2 is a cross-sectional view of the traction band shown in FIG. 1 in which the sprocket and support wheels are also shown.
Figure 3:
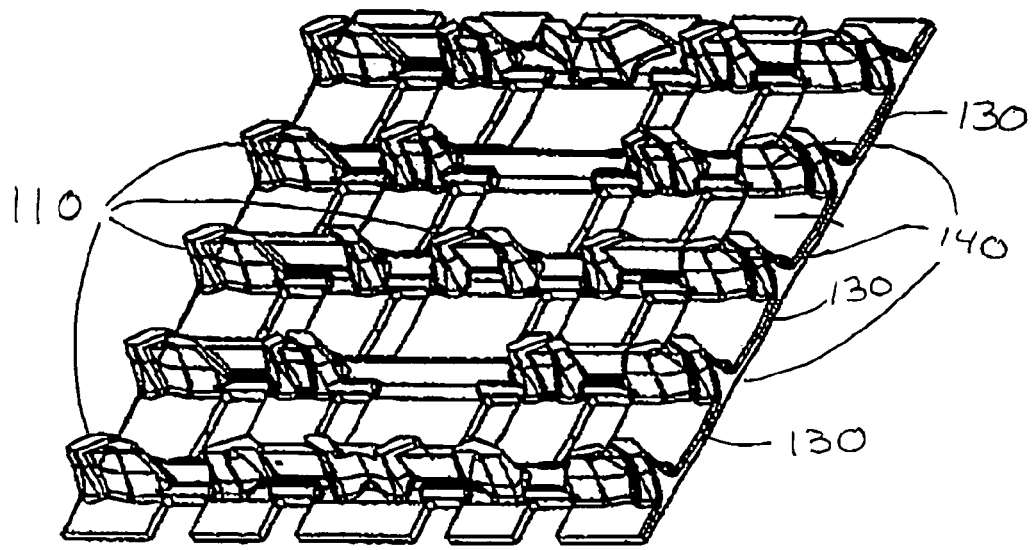
FIG. 3 is an isometric view of the traction band shown in FIG. 1.
Figure 4:
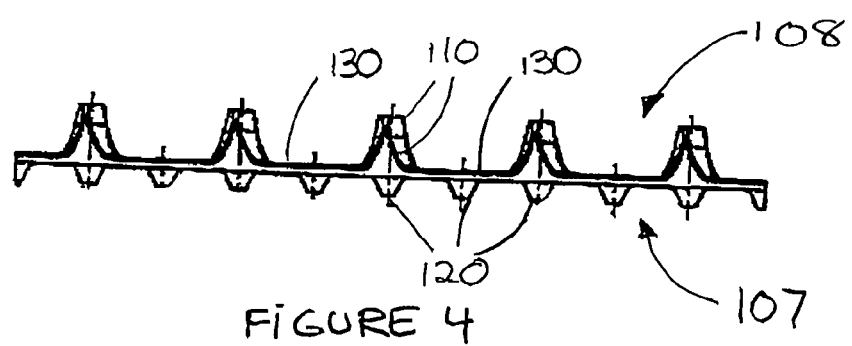
FIG. 4 is a side view of the traction band shown in FIG. 1.

In the embodiment shown in FIG. 2, the sprocket drive wheel is formed of two disks 210 and 220, each having a series of teeth 215 and 225, and are disposed on the inner side of the band such that the teeth 215 and 225 preferably extend sequentially through each opening of said series 165 and 175.

Figure 8:
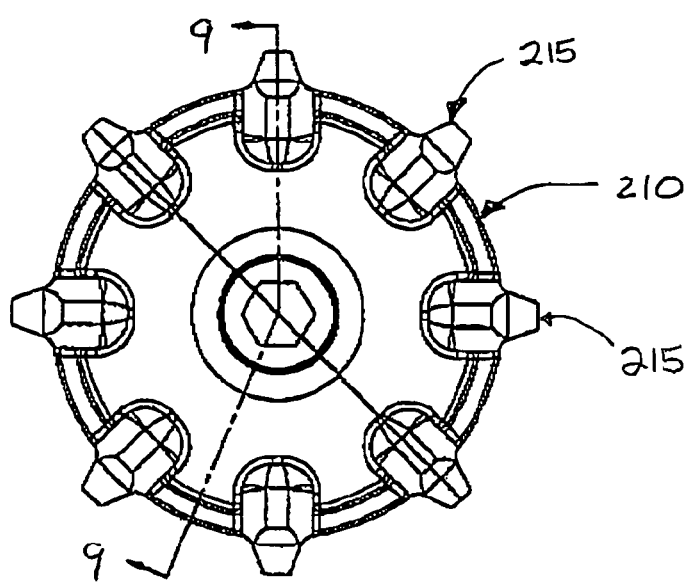
FIG. 8 is a side view of a sprocket wheel in accordance with this invention.
Figure 9:
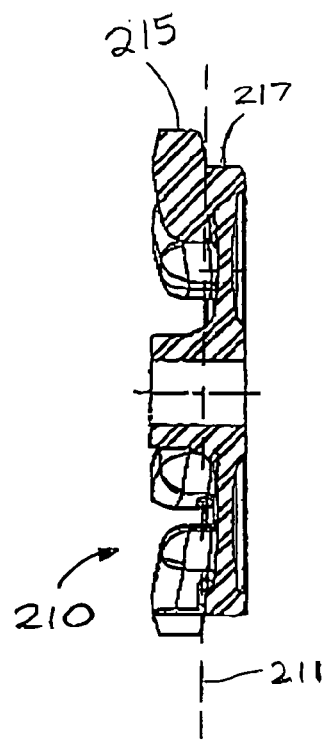
FIG. 9 is a cross-sectional view taken along line 9—9 of the sprocket wheel shown in FIG. 8.
Figure 10:
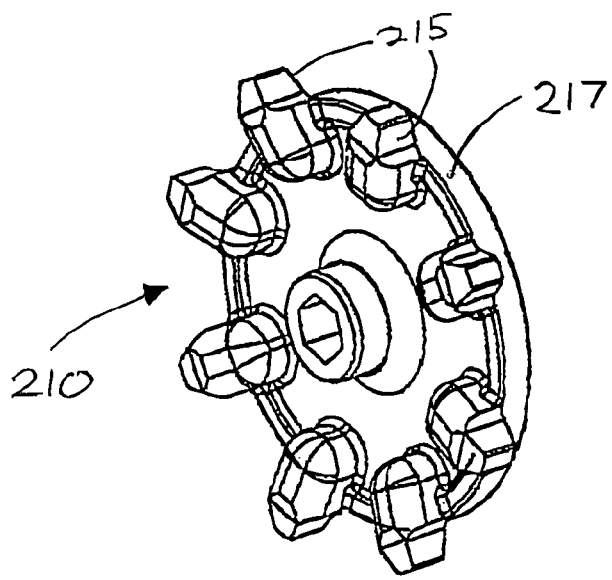
FIG. 10 is an isometric view of the sprocket wheel shown in FIG. 8.

The disks 210 and 220 may be made of plastic or any another similar material. FIGS. 8, 9 and 10 illustrate for one disk 210 how the series of teeth 215 are off-centered from the central radial plane 211 of the disk 210, therefore providing space for a cylindrical root area 217.

Figure 5:
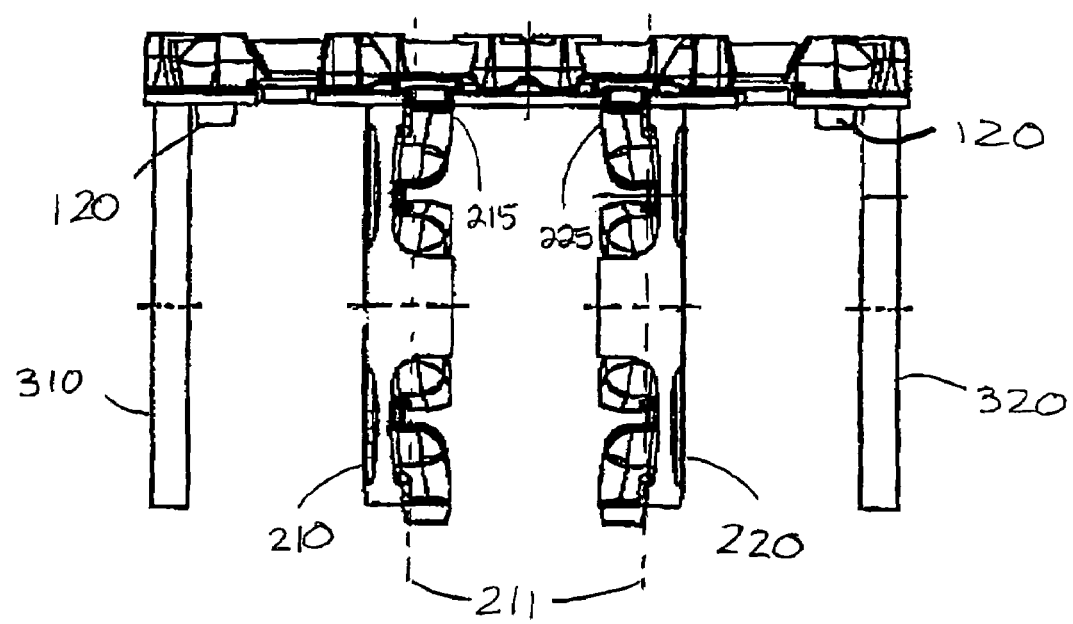
FIG. 5 is a cross-sectional view of the traction band shown in FIG. 1 which incorporates another embodiment for the sprocket and support wheels.

FIG. 5 illustrates another assembly configuration between the disks 210, 220 and the band 100. Since the series of teeth 215, 225 are off-centered from the central radial plane 211 of the disks 210, 220, the teeth 215, 225 may also be laterally located more inboard than their respective central radial plane 211 with respect to the band 100. Alternatively, the disks 210, 220 may be assembled with the band 100 such that their teeth 215, 225 may also be laterally located more outboard than their respective central radial plane 211 with respect to the band 100, as shown in the embodiment of FIG. 2. Those variations permit to suit various physical requirements for a vehicle equipped with such a band 100 or to obtain a different riding behavior.

Figure 13:
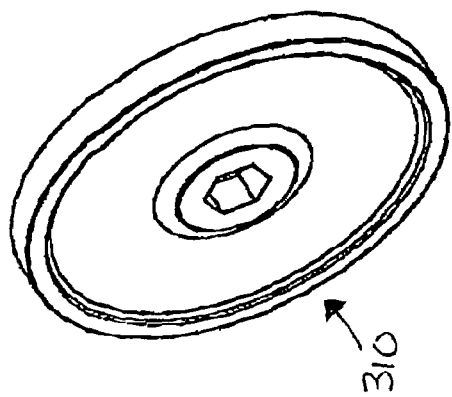
FIG. 13 is an isometric view of the support wheel shown in FIG. 11.
Figure 12:
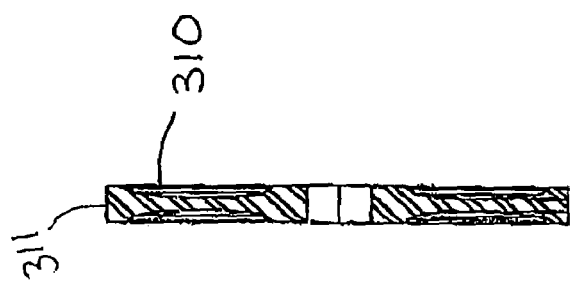
FIG. 12 is a cross-sectional view taken along line 12—12 of the support wheel shown in FIG. 11.
Figure 11:
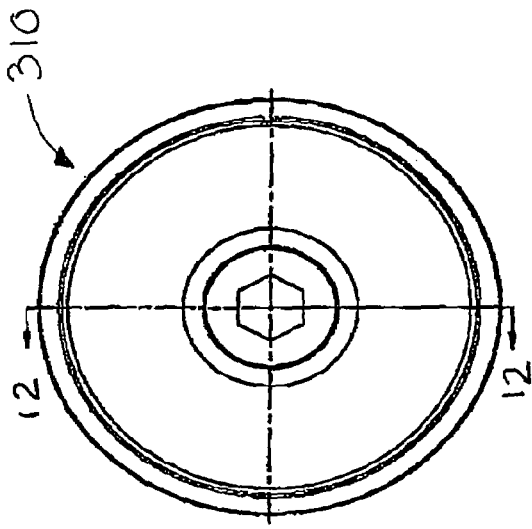
FIG. 11 is a side view of a support wheel in accordance with this invention.
Figure 14:
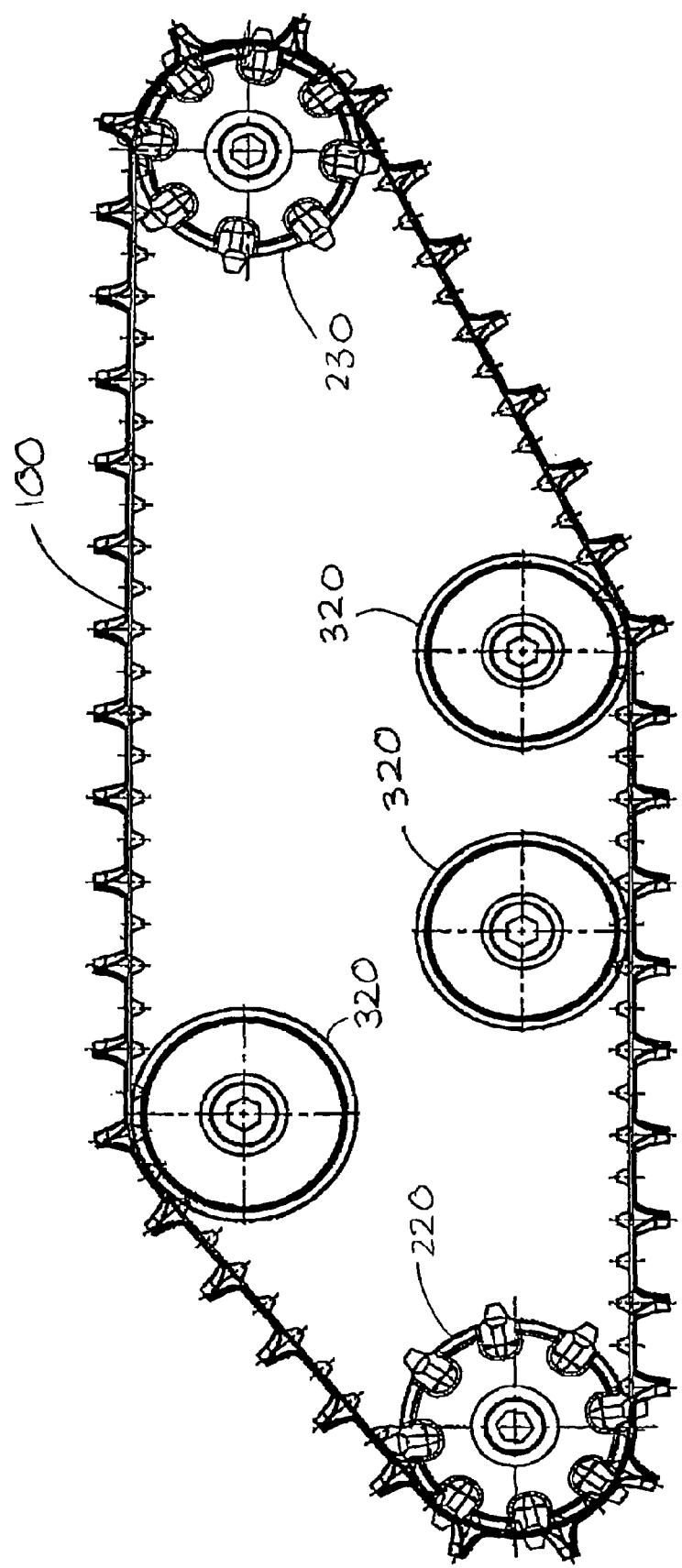
FIG. 14 is a side view of the traction band shown in FIG. 1 as installed over sprocket wheels shown in FIG. 8 and support wheels shown in FIG. 11.

It is shown in FIGS. 1, 5 and 14 how a plurality of support wheels 310 and 320 are optionally used and how they may be disposed to support the band 100 and the vehicle. A series of guiding lugs 120 are placed on the inside of the traction band to help maintain the position traction band 100 with respect to the support wheels 310 and 320. FIGS. 11, 12 and 13 illustrate in more details one support wheel 310 and it's riding area 311 which is optionally in contact with the band 100.

For snowmobiles which are equipped with an endless rubber traction band 100, the capacity to offer to the users a smooth and stable ride with the minimum of noise and vibration levels represents one of the characteristics that is most appreciated by customers. On top of that, the traction band 100 has a lesser weight since more series of openings 165, 175, 185, 195 are required and the band 100 also has a lower cost since less material is required to produce it.

In the preferred embodiment shown in FIGS. 1, 2, 3 and 4, the sprocket drive wheel cooperates with the central band portion 150. In each disk 210 and 220, the cylindrical root area 217 offers a support to the traction band 100 and help maintain its circularity as it rotates. This configuration generally helps lower the vibration levels of the traction band and therefore reduce the generated noise. This phenomenon is partly explained by the fact that the typical root area 217 of the prior art in between two consecutive teeth, which are usually centered in a radial plane with respect to the disk, can not offer a continuous support area to the traction band 100 as it rotates.

Preferably, no metal clips (not shown), are located at the support areas 167, 177 of the central band portion 150, therefore minimizing the level of generated noise as the series of teeth 215, 225 mesh with the support areas 167, 177. In the preferred embodiment, the support areas 187, 197 in the mid-band portions 160, 170 offer support to metal clips (not shown) to provide a sliding surface for the traction band, without producing high level of noises that are sometimes associated with the use of metal clips (not shown).

Figure 6:
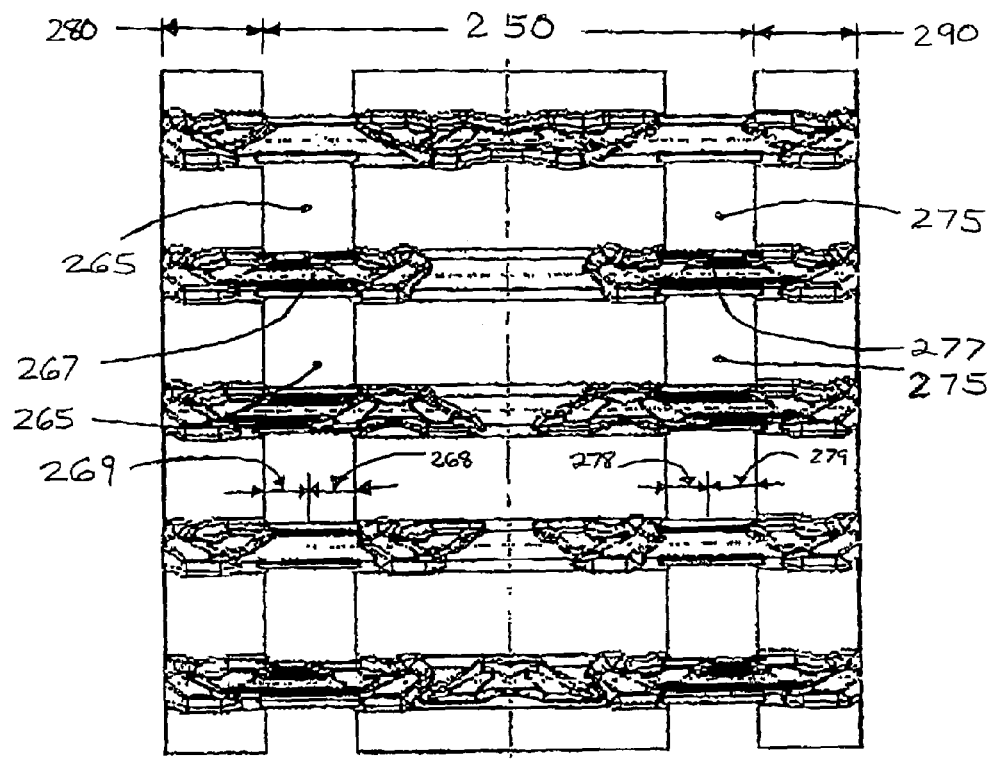
FIG. 6 is a partial top view of another embodiment for the endless traction band in accordance with the invention.
Figure 7:
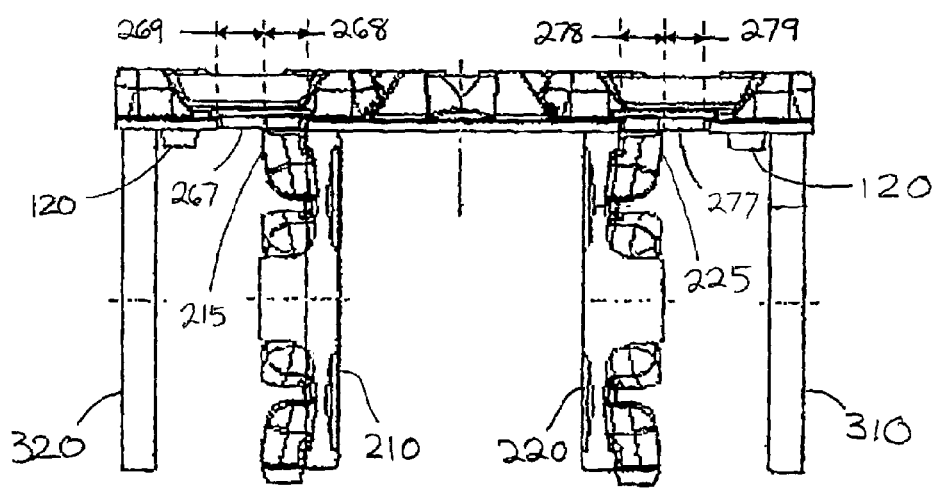
FIG. 7 is a cross-sectional view of the traction band shown in FIG. 6 in which the sprocket and support wheels are also shown.

FIGS. 6 and 7 illustrate another embodiment of this invention, which comprises a central band portion 250 and two lateral band portions 280, 290. The central band portion 250 comprises a series of openings 265 and 275. Any two consecutive openings 265, 275 in the same longitudinal series of openings define a support area 267, 277, which each comprises a mesh area 268, 278 and a clip area 269, 279. Metal clips (not shown) are located at the clip area 269, 279 to provide a sliding surface to the traction band 100. The series of teeth 215, 225 preferably cooperate with the clip-less mesh areas 268, 278.

Similarly to the illustrated embodiments of FIGS. 2 and 5 and as described hereinabove, each disks 210, 220 may be oriented with respect to the band 100 such that their teeth 215, 225 are laterally more inboard or more outboard (FIG. 7) than their respective radial plane 211, to suit various physical requirements of a vehicle equipped with such a band 100 or to obtain a different riding behavior. Accordingly, the lateral positioning of the mesh areas 268, 278 and the clip area 269, 270 may differ for a support area 267, 277.

FIG. 14 schematically illustrate one embodiment of the interactions between the band 100, the drive sprockets 220,230 and the support wheels 320 for one type of vehicle. Alternatively one of the sprockets 230, for which no drive power is supplied from the vehicle, may provide lateral guidance to the traction band 100 as its teeth 215 sequentially mates with the mesh areas of the rotating traction band 100.

Although a preferred embodiment of the invention has been described in detail herein and illustrated in the accompanying figures, it is to be understood that the invention is not limited to this precise embodiment and that various changes and modifications may be effected therein without departing from the scope or spirit of the present invention.

The invention claimed is:

1. A traction band system for a vehicle comprising:
    a) a traction band comprising:
        i) a body having an inner side and an outer side,
        ii) a plurality of holes through said body, said holes being generally longitudinally aligned in at least one row of holes,
    b) a sprocket wheel comprising at least one disk, said disk having a generally central radial plane and comprising:
        i) a circumferential root area;
        ii) a plurality of radially extending teeth, said teeth being laterally offset from said plane,
    such that said root area matingly cooperates with said inner side of said body and wherein any two consecutive said holes along said row of holes define a support area on said body, said support area comprising a laterally extending mesh area adjacent to a laterally extending clip area, such that said teeth mesh with said mesh area.

2. A traction band system as claimed in claim 1, wherein said clip area supports a clip.

3. A traction band system for a snowmobile comprising:
    a) a traction band comprising a body having an inner surface and a ground-engaging outside surface on which are disposed a series of laterally extending traction lug profiles separated from each other by flat areas, each of which extend laterally and comprise none of the said traction lugs, said traction band further comprising:
        i) a longitudinally extending central band portion,
        ii) a pair of longitudinally extending lateral band portions,
        iii) a pair of longitudinally extending mid-band portions, each said mid-band portion being located between said central band portion and one of said lateral band portions,
        iv) a plurality of holes through said flat areas, said holes being generally longitudinally aligned in rows separating said central, lateral and mid-band portions;
        wherein any two consecutive said holes along at least a first of said rows of holes define a laterally extending mesh area on said body and wherein any two consecutive said holes along at least a second of said rows of holes define a laterally extending clip area on said body;
    b) a sprocket wheel comprising at least one disk, said disk having a generally central radial plane and comprising:
        i) a circumferential root area;
        ii) a plurality of radially extending teeth, said teeth being laterally offset from said plane;
        wherein said teeth mesh with said mesh area.

4. A traction band system as claimed in claim 3, wherein said root area matingly cooperates with said inner side of said body.

5. A traction band system as claimed in claim 4, wherein said root area matingly cooperates with said central band portion.

6. A traction band system as claimed in claim 4, wherein said root area matingly cooperates with said mid-band portion.

7. A traction band system as claimed in claim 4, wherein said root area matingly cooperates with said lateral band portion.

8. A traction band system for a snowmobile comprising:
    a) a traction band comprising a body having an inner surface and a ground-engaging outside surface on which are disposed a series of laterally extending traction lug profiles separated from each other by flat areas, each of which extend laterally and comprise none of the said traction lugs, said traction band further comprising:
        i) a longitudinally extending central band portion;
        ii) a pair of longitudinally extending lateral band portions, each said lateral band portion being located on each side of said central band portion;
        iii) a plurality of holes through said flat areas, said holes being generally longitudinally aligned in rows separating said central and lateral band portions;
        wherein any two consecutive said holes along at least one of said rows of holes define support area on said body, said support area comprising a laterally extending mesh area adjacent to a laterally extending clip area;
    b) a sprocket wheel comprising at least one disk, said disk having a generally central radial plane and comprising:
        i) a circumferential root area;
        ii) a plurality of radially extending teeth, said teeth and being laterally offset from said plane;
        wherein said teeth mesh with said mesh area.

9. A traction band system as claimed in claim 8, wherein said root area matingly cooperates with said inner side of said body.

10. A traction band system as claimed in claim 8, wherein said root area matingly cooperates with said central band portion.

11. A traction band system as claimed in claim 8, wherein said root area matingly cooperates with said lateral band portion.

12. A traction band system as claimed in claim 3, wherein said clip area supports a clip.

13. A traction band system as claimed in claim 8, wherein said clip area supports a clip.

* * * * *